US008437957B2

(12) United States Patent
Coulmeau et al.

(10) Patent No.: US 8,437,957 B2
(45) Date of Patent: May 7, 2013

(54) METHOD AND DEVICE FOR CHECKING THE CONFORMITY OF AN AIRCRAFT TRAJECTORY

(75) Inventors: François Coulmeau, Seilh (FR); Nicolas Marty, Saint Sauveur (FR); Xavier Blanchon, Toulouse (FR); Pierre Gamet, Blagnac (FR)

(73) Assignee: Thales (FR)

( * ) Notice: Subject to any disclaimer, the term of this patent is extended or adjusted under 35 U.S.C. 154(b) by 140 days.

(21) Appl. No.: 13/004,704

(22) Filed: Jan. 11, 2011

(65) Prior Publication Data

US 2011/0172914 A1 Jul. 14, 2011

(30) Foreign Application Priority Data

Jan. 12, 2010 (FR) ..................................... 10 00104

(51) Int. Cl.
*G01C 21/20* (2006.01)

(52) U.S. Cl.
USPC ........... 701/528; 701/122; 701/411; 701/466; 340/995.19

(58) Field of Classification Search .................. 701/442, 701/446, 448, 466, 532, 120, 122, 411, 461, 701/528, 533; 340/995.19, 995.21
See application file for complete search history.

(56) References Cited

U.S. PATENT DOCUMENTS

| | | | | |
|---|---|---|---|---|
| 5,991,675 | A * | 11/1999 | Asanuma | 701/41 |
| 8,089,375 | B1 * | 1/2012 | Seah | 701/14 |
| 2003/0065428 | A1 * | 4/2003 | Mendelson et al. | 701/9 |
| 2008/0103641 | A1 | 5/2008 | Ratcliffe | |
| 2008/0140269 | A1 | 6/2008 | Naimer et al. | |
| 2008/0140273 | A1 * | 6/2008 | Deker | 701/14 |
| 2008/0177427 | A1 * | 7/2008 | Marty et al. | 701/3 |
| 2009/0182764 | A1 | 7/2009 | Subelet et al. | |
| 2010/0332111 | A1 * | 12/2010 | Closse et al. | 701/120 |

FOREIGN PATENT DOCUMENTS

| | | | |
|---|---|---|---|
| FR | 2 893 158 | A1 | 5/2007 |
| WO | 2009/035757 | A2 | 3/2009 |

* cited by examiner

*Primary Examiner* — Thomas Tarcza
*Assistant Examiner* — Kevin Myhre
(74) *Attorney, Agent, or Firm* — Baker & Hostetler, LLP

(57) ABSTRACT

A method and device checks the conformity of a trajectory calculated by a flight management system of an aircraft in relation to reference data comprising a reference map. The method includes: geo-referencing of a reference map; determination of a reference trajectory from the geo-referenced reference map; detection of nonconformity in the trajectory calculated by the flight management system by comparison of the trajectory calculated by the flight management system with the reference trajectory; and emission of a warning if a nonconformity is detected.

12 Claims, 4 Drawing Sheets

METHOD AND DEVICE FOR CHECKING THE CONFORMITY OF AN AIRCRAFT TRAJECTORY

CROSS-REFERENCE TO RELATED APPLICATION

This application claims priority to foreign French patent application No. FR 1000104, filed on Jan. 12, 2010, the disclosure of which is incorporated by reference in its entirety.

FIELD OF THE INVENTION

The invention relates to the flight management of an aircraft and, more particularly, the checking of the conformity of a trajectory calculated by a flight management system.

BACKGROUND

Air traffic management in general and the regulations concerning safety and therefore concerning separation from the relief and segregation between aircraft have for a very long time required the state organisations and airport authorities to publish take-off or landing procedures guaranteeing the safety of the flights leaving from or arriving at the airports.

These graphic or text procedures have for a long time been available only in paper form. The advent of flight management systems having brought with it the need to electronically manage all the take-off or landing procedures published by the states.

Currently, the textual and graphical procedures are supplied by the member states of the International Civil Aviation organization to the suppliers of navigation databases and are converted by the suppliers into series of legs. A leg is a flight plan portion defined by certain parameters (for example: position, altitude, heading/route rules). The coding rules for civil aviation are described in an international document published by the ARINC Committee (document ARINC 424). The current standard is issue 17 of this document.

FIG. 1 represents a diagram of a trajectory determination method according to the prior art. This method comprises: the design of flight procedures 102 from raw data 101 obtained from the states. This step is performed using dedicated design tools such as GeoTitan. These raw data enriched with procedures are coded 103 in the ARINC 424 standard, then integrated 104 in a flight management system. The flight management system uses these coded data as a basis for calculating 105 flight trajectories.

One of the most important principles in the production of navigation databases is that the data must not be corrupted, in other words the digitization method must not introduce degradations in the procedure.

The management of a trajectory from the published procedures therefore involves processing, in the flight management system, all the legs defined in ARINC424-17, or 20 legs and 3 holding patterns (race-track patterns), and above all, all sequencing combinations of these legs.

The legs currently defined are

- so-called "fixed" legs, the termination of which is a waypoint that is published and fixed on the ground,
- so-called "floating" legs, the termination of which is given by a variable condition (for example, altitude legs which terminate when the aeroplane has reached the altitude concerned), and
- holding "procedure" legs (holding patterns, 3 types) and reversal procedure legs on approach (1 type).

There are eight "fixed" legs, eleven floating legs and four procedure legs.

The table below gives the various legs:

| Leg | Name | Meaning |
|---|---|---|
| IF | Initial Fix | Initial point fixed on the ground |
| CF | Course To a Fix | Rejoin/follow a ground route to a fixed point |
| DF | Direct to a Fix | Directly (in a straight line) to rejoin a fixed point |
| TF | Track between two Fixes | Great circle route between two fixed points |
| AF | Arc DME to a Fix | Defines an arc of circle around a DME beacon at a specified distance, with an aperture limit |
| RF | Radius to a Fix | Defines an arc of circle between 2 fixed points (the first point being the fixed point of the preceding leg), on a centre of the fixed circle |
| VI | Heading to Intercept | Defines a heading to be followed until the next leg is intercepted |
| CI | Course to Intercept | Defines a route to be followed until the next leg is intercepted |
| VA | Heading to Altitude | Defines a heading to be followed to a given altitude |
| CA | Course to Altitude | Defines a route to be followed to a given altitude |
| FA | Fix to Altitude | Defines a route to be followed, starting from a fixed point, to a given altitude |
| VD | Heading to DME Distance | Defines a heading to be followed until a specified DME arc is intercepted |
| CD | Course to DME Distance | Defines a route to be followed until a specified DME arc is intercepted |
| VR | Heading to Radial | Defines a heading to be followed until a specified radial is intercepted |
| CR | Course to Radial | Defines a route to be followed until a specified radial is intercepted |
| FC | Track from Fix to Distance | Defines a route to be followed starting from a fix, over a specified distance |
| FD | Track from Fix to DME Distance | Defines a route to be followed starting from a fix, until a DME arc is intercepted (DME distance specified) |
| VM | Heading to Manual | Defines a heading without termination (infinite half-right) |
| FM | Fix to Manual | Defines a route, starting from a fix, without termination (infinite half-right) |
| HA | | Race-track circuit, with altitude exit conditions |
| HF | | Race-track circuit, with a single rotation |
| HM | | Manual race-track circuit, with no exit condition |
| PI | Fix to Manual | Separation procedure defined by a separation route starting from a fix, followed by a half-turn, and interception of the initial separation route for the return |

In addition, the current standards limit the number of leg combinations by prohibiting certain leg sequences. Thus, at 529 possible leg combinations approximately only 360 are allowed. This very large number of procedures primarily has two negative impacts: trajectories are difficult to develop in the flight management systems because of this combination and the dispersion in terms of lateral position may be very significant with floating legs.

SUMMARY OF THE INVENTION

The invention enhances the robustness of the embedded flight management systems by ensuring that the construction of the trajectory by the embedded system actually corresponds to the procedure as defined by the air navigation authorities.

To this end, the subject of the invention is a method for checking the conformity of a trajectory calculated by a flight management system of an aircraft in relation to reference data comprising a reference map, said procedure being characterized in that it comprises the following steps:

geo-referencing of the reference map, determination of a reference trajectory from the geo-referenced reference map, detection of nonconformity in the trajectory calculated by the flight management system by comparison of the trajectory calculated by the flight management system with the reference trajectory, emission of a warning if a nonconformity is detected.

According to one feature of the invention, the determination of a reference trajectory from the reference map comprises:

the extraction of data characteristic of the reference map, the calculation of a raw reference trajectory from the characteristic data, a processing of the raw reference trajectory.

Advantageously, the trajectory calculated by the flight management system being a succession of flight segments, the method also comprises a step of functional characterization of the reference trajectory breaking down the reference trajectory into basic trajectory portions and in that the nonconformity detection also comprises a comparison of the basic trajectory portions with the flight segments of the trajectory calculated by the flight management system.

According to one feature of the invention, the comparison of the trajectory calculated by the flight management system with the reference trajectory comprises:

the setting of both trajectories to a common scale, the extraction of a trajectory portion from the reference trajectory, the calculation of an image comprising the two trajectories set to a common scale.

Advantageously, the reference data comprise a plurality of maps each describing a flight procedure, the steps for geo-referencing (301) and determination of a reference trajectory being applied to each of the maps, the comparison step being preceded by a step for merging the various calculated trajectories.

According to a variant of the invention, the reference map is a paper map and the method also comprises a step for digitizing the paper map, the digital map comprising individual points, the step for extraction of data characteristic of the reference map implementing a shape recognition method applied to the digital map, the aim of the processing of the raw reference trajectory being to ensure the continuity of the reference trajectory, and the comparison of the trajectory calculated by the flight management system with the reference trajectory comprising the comparison of the image comprising the two trajectories set to a common scale with an image comprising only the reference trajectory, a non-conformity being detected if the number of individual points that are different between the two images is greater than a first predetermined threshold.

According to another variant of the invention, the reference map is a digital map comprising graphic objects, the step for extraction of data characteristic of the reference map implementing a vectorization method applied to the map, the aim of the processing of the raw reference trajectory being to determine the mathematical characteristics of the elements of the raw trajectory in order to derive therefrom a succession of straight segments and arcs, the comparison of the trajectory calculated by the flight management system with the reference trajectory comprising a calculation of surface area between the calculated trajectory and the reference trajectory appearing on the image comprising the two overlaid trajectories, a nonconformity being detected if the surface area exceeds a second predetermined threshold.

Advantageously, the determination of a reference trajectory from the geo-referenced reference map also comprising an image-processing substep in order to remove disturbing elements.

Advantageously, the reference map comprising contour lines, it also comprises a step for comparison of the calculated trajectory with data from a terrain database to detect conflicts between the trajectory and obstacles situated on the ground, the terrain database comprising data extracted from the contour lines of the reference map.

The invention also relates to a device for checking the conformity of a trajectory calculated by a flight management system of an aircraft relative to reference data comprising a reference map, said device being characterized in that it comprises:

means for geo-referencing the reference map, means for determining a reference trajectory from the geo-referenced reference map, means for detecting nonconformity in the trajectory calculated by the flight management system by comparison of the trajectory calculated by the flight management system with the reference trajectory, means for emitting a warning if a nonconformity is detected.

According to a variant of the invention, the device for checking the conformity of a trajectory is embedded onboard the aircraft.

According to another variant of the invention, the device for checking the conformity of a trajectory is situated on the ground in an air traffic control unit.

The invention has the advantage of enhancing the robustness of the embedded flight management systems, but also of reducing the risk of departures from the procedure by detection, on the ground or onboard, of any conflicts.

The invention makes it possible to automatically detect, onboard the aircraft, that the trajectory calculated by the embedded systems corresponds to the "paper" procedure published by the states.

The invention can also be used by air traffic control to check this same information. Currently, an air traffic controller has tools for checking that the aeroplane radar plot (the radar echo picked up by the ground radars and displayed on the controller's screen overlaid on the air space mesh) is on the flight plan filed by the airline. However, these tools do not make it possible to anticipate that the calculated flight plan corresponds to the one used as a reference. The issue arises in particular in the case of regular downloads from the aircraft to the ground (or downlinks) of the current flight plan.

Finally, the invention makes it possible to detect on the ground, in the design phase of an FMS, that all the trajectories deriving from the procedures correspond to the state data.

BRIEF DESCRIPTION OF THE DRAWINGS

The invention will be better understood and other advantages will become apparent from reading the detailed description given as a nonlimiting example and with the help of the figures in which.

DETAILED DESCRIPTION

The present invention makes it possible to compare a trajectory calculated by a flight management system of an aircraft with a reference trajectory published in the form of a paper or digital map.

Figure 1:
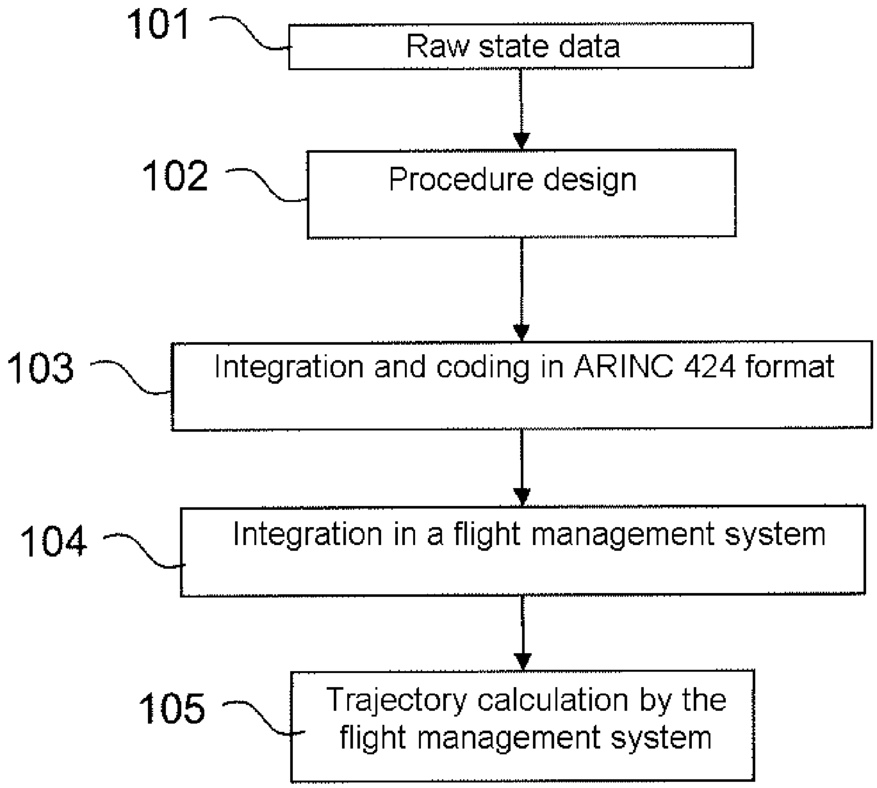
FIG.1 PRIOR ART
FIG. 1, already described, represents a diagram of a trajectory determination method according to the prior art.
Figure 2A:
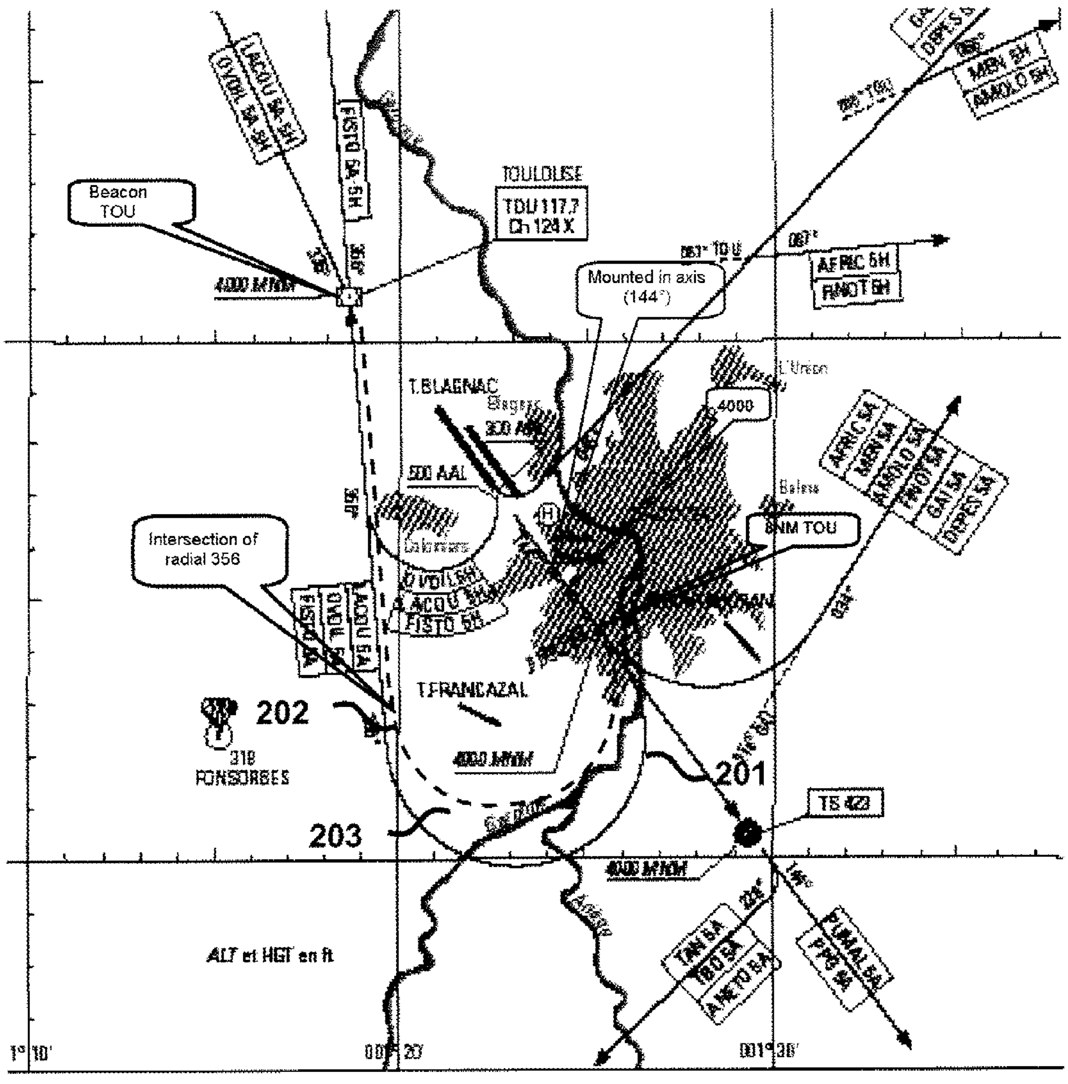
FIG. 2A represents an exemplary map according to the prior art.
Figure 2B:
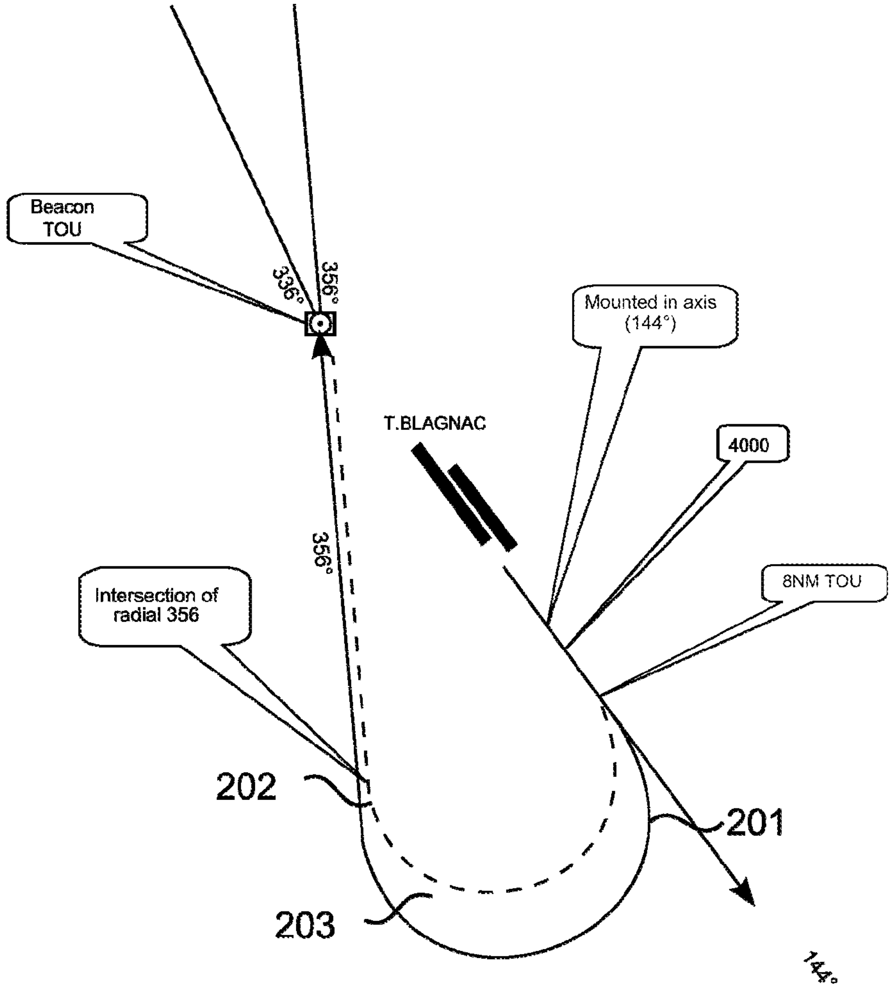
FIG. 2B represents particular features of the exemplary map of FIG. 2A.

According to the prior art, a flight procedure is described in the form of raw data comprising a map and instructions. FIGS. 2A and 2B illustrate an example of such a map. This map notably represents a take-off procedure from the Toulouse-Blagnac airport. This map is accompanied by the following instructions describing the reference trajectory 201: "after take-off off, follow RDL144 (RM144) in a climb to the designated level. At 4000 AMSL minimum and not before 8 NM TOU, turn right to intercept and follow RDL176 (RM356) as far as TOU. At TOU, follow RDL356 (RM356) to FISTO (47NM TOU)". The various identification points indicated in these instructions between brackets are indicated by bubbles on the map.

This procedure was coded by a navigation database supplier as follows:

LFBO14R: starting point, runway threshold,

1000: leg CA to 1000 feet, route 144°,

TOU8D: leg CF, termination TOU8 with passage over the point, route 144°,

4000: Leg CA, termination 4000 feet, route 144°,

INTCPT: Leg CI, intercepting the next leg on route 311°,

TOU: Leg CF, termination TOU, route 356°,

FISTO: Leg CF, termination FISTO, route 356°.

Also represented on this map is the trajectory 202 as calculated by the onboard system (FMS type), according to the capabilities of the aircraft and of its guidance modes.

Two reasons may explain a divergence between the reference trajectory and the trajectory calculated by the flight management system. the first is an error in coding the procedure which must be corrected. The second is the use of floating legs. These legs are directly dependent on the capability of the aircraft. Such is the case, for example, for turns. These divergences between the reference trajectory and the trajectory calculated by the flight management system do not require correction. It is therefore advisable to differentiate these two types of deviation and therefore check whether a divergence is acceptable.

According to a first variant embodiment of the invention, the reference map is a paper map. The method then includes a step for digitization of the paper map. The digitized map comprises individual points.

According to a second variant embodiment of the invention, the reference map is a digital map comprising graphic objects.

Figure 3:
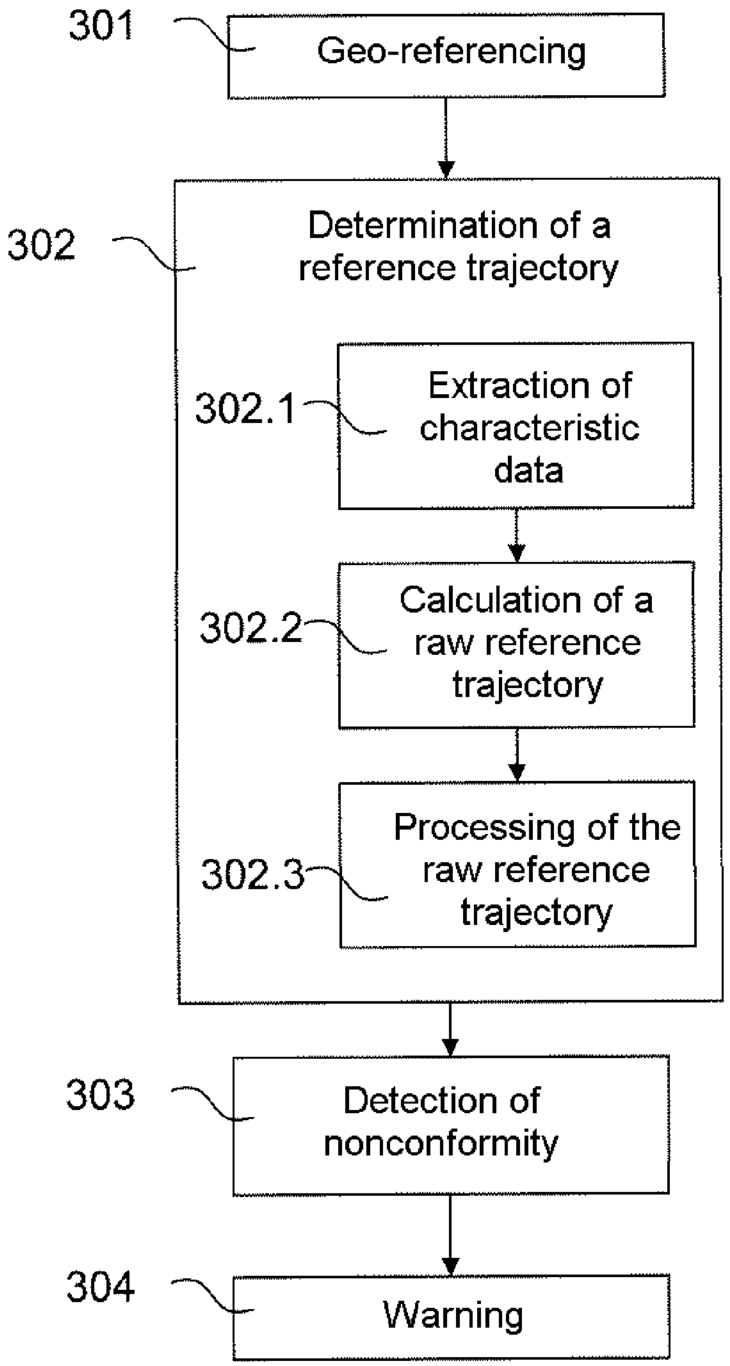
FIG. 3 represents a flow diagram of the method according to the invention.

FIG. 3 represents a flow diagram of the method according to the invention. The aim of the method according to the invention is to check the conformity of the trajectory calculated by a flight management system against reference data comprising a reference map. The method comprises the following steps:

geo-referencing 301 of the reference map, determination 302 of a reference trajectory from the geo-referenced reference map.

detection 303 of non-conformity in the trajectory calculated by the flight management system by comparison of the trajectory calculated by the flight management system with the reference trajectory, emission 304 of a warning if a non-conformity is detected.

The geo-referencing step 301 extracts the parameters of an aeronautical map in order to deduce therefrom horizontal and vertical scales and the north direction. Its aim is then to set said map to a predetermined scale.

The step 302 for determination of a reference trajectory from the reference map comprises the following substeps:

the extraction 302.1 of data characteristic of the reference map, the calculation 302.2 of a raw reference trajectory from the characteristic data, a processing 302.3 of the reference trajectory.

In the first variant embodiment of the invention, the substep 302.1 for extraction of the characteristic data is performed by image processing, for example by implementing a shape recognition method applied to the digitized map.

The following can, for example, be cited: the conventional and known OCR (Optical Character Recognition) techniques for all textural information, transforms for extracting the lines and curves (such as, for example, the "Hough" transform) or the various shape extraction/separation transforms (such as, for example, the Borgefors Chamfrein techniques).

In the second variant embodiment of the invention, the substep 302.1 for extraction of the characteristic data is preformed by processing elements associated with the map (vectors, points) supplied in the context of the digitization and vectorization of the reference map.

The raw reference trajectory is a succession of trajectory elements corresponding to the procedure, extracted from the map (points, trajectory segments, runways, beacons, etc.) in the form of individual points in the first variant or vectors in the second variant.

Advantageously, the determination 302 of a reference trajectory from the geo-referenced reference map also comprises an image-processing substep for removing disturbing elements such as the terrain sections which appear as coloured contour lines.

In the first variant embodiment of the invention, the aim of the processing 302.3 of the raw reference trajectory is to ensure the continuity of the trajectory. In practice, the digitization of the map produces a trajectory consisting of a succession of individual points which are not necessarily adjacent.

In the second variant embodiment of the invention, the processing 302.3 consists in determining the mathematical characteristics of the elements of the raw trajectory in order to derive therefrom a succession of straight segments and arcs.

The aim of this processing is also to "expand the trajectory" according to tolerance criteria determined for the procedures with horizontal navigation accuracy requirements of RNP (Required Navigation Performance) type.

This processing can also be used to extract other characteristic elements such as waypoints according to the applicable legends (for example, certain map suppliers use a triangle to represent a waypoint and a rectangle to represent a runway), and extract the name of each waypoint from the "texts" surrounding each triangle/rectangle.

The step 303 for detecting nonconformity in the trajectory calculated by the flight management system is performed by comparison of the trajectory calculated by the flight management system with the reference trajectory.

This step firstly comprises the overlaying of the reference trajectory with the calculated trajectory. In the first variant embodiment of the invention, this comprises setting the image comprising the reference trajectory to scale and overlaying the calculated trajectory on this image. In the second variant of the invention, it comprises setting the vectors of the calculated trajectory and of the reference trajectory to one and the same scale.

According to one feature of the invention, the comparison is preceded by a step for extraction of a trajectory portion from the calculated trajectory. In practice, generally, the reference trajectory corresponds to a standard procedure, for example a standard approach procedure called “STAR” (Standard Terminal Arrival Route) which represents only a part of the trajectory calculated by the flight management system. Before the trajectories are compared, only the calculated trajectory portion corresponding to the standard procedure concerned (for example, the approach) is extracted.

Advantageously, the reference data comprise a plurality of maps each describing a flight procedure, the steps for the geo-referencing and determination of a reference trajectory being applied to each of the maps, the comparison step being preceded by a step for merging of the various calculated trajectories. A number of maps and therefore a number of reference trajectories are overlaid. This has the advantage of not truncating the calculated trajectory. For example, it is possible to use a STAR map and an approach map and compare them to the calculated trajectory on the basis of a STAR and approach pairing.

The comparison step comprises the calculation of an image comprising two trajectories set to the scale and overlaid.

In the first variant embodiment of the invention, the detection comprises comparison of the image of the map comprising the reference trajectory with the image comprising the two overlaid trajectories. If there are differences between these two images, then this means that the calculated trajectory is different from the reference trajectory. A nonconformity is detected if the number of individual points that are different between the two images is greater than a first predetermined threshold.

In the second variant embodiment of the invention, the detection comprises calculation of the surface area between the calculated trajectory and the reference trajectory given in the image comprising the two overlaid trajectories. FIGS. 2A and 2B illustrate an example 203 of such a surface area. A nonconformity is detected if the surface area exceeds a second predetermined threshold.

Advantageously, the trajectory calculated by the flight management system being a succession of flight segments, the method also comprises a step for functional characterization of the reference trajectory breaking down the reference trajectory into basic trajectory portions and the nonconformity detection also comprises comparison of the basic trajectory portions with the flight segments of the trajectory calculated by the flight management system. It is then possible to compare, for example, a succession of straight lines and of turn directions, without overlaying the images. For example, if the reference trajectory comprises a straight line, then a turn to the left and then a straight line and then a turn to the right, it is possible to check that the calculated trajectory follows the same breakdown.

Advantageously, lengths are associated with each of the straight segments or turns to refine the comparison.

Advantageously, the method according to the invention also comprises a step for comparison of the calculated trajectory with a terrain database to detect conflicts between the trajectory and obstacles on the ground. The terrain database comprises data extracted from the contour lines of the reference map.

The invention claimed is:

1. A method for checking the conformity of a trajectory calculated by a flight management system of an aircraft in relation to reference data comprising a reference map, said reference map comprising a paper map or a digital map, comprising the following steps:

geo-referencing of the reference map, determination of a reference trajectory from the geo-referenced reference map, detection of nonconformity in the trajectory calculated by the flight management system by comparison of the trajectory calculated by the flight management system with the reference trajectory, and emission of a warning if a nonconformity is detected.

2. The method according to claim 1, wherein the determination of a reference trajectory from the reference map further comprises:

extraction of data characteristic of the reference map, calculation of a raw reference trajectory from the characteristic data, and processing of the raw reference trajectory.

3. The method according to claim 1, wherein, the trajectory calculated by the flight management system being a succession of flight segments, the method further comprises a step of functional characterization of the reference trajectory breaking down the reference trajectory into basic trajectory portions, and wherein the nonconformity detection further comprises a comparison of the basic trajectory portions with the flight segments of the trajectory calculated by the flight management system.

4. The method according to claim 1, wherein the comparison of the trajectory calculated by the flight management system with the reference trajectory further comprises:

setting of both trajectories to a common scale, extraction of a trajectory portion from the reference trajectory, and calculation of an image comprising the two trajectories set to a common scale.

5. The method according to claim 1, wherein the reference data comprise a plurality of maps each describing a flight procedure, the steps for geo-referencing and determination of a reference trajectory being applied to each of the maps, the comparison step being preceded by a step for merging the various calculated trajectories.

6. The method according to claim 4, wherein the reference map is a paper map and wherein the method further comprises a step for digitizing the paper map, the digital map comprising individual points, the step for extraction of data characteristic of the reference map implementing a shape recognition method applied to the digital map, the aim of the processing of the raw reference trajectory being to ensure the continuity of the reference trajectory, and the comparison of the trajectory calculated by the flight management system with the reference trajectory comprising the comparison of the image comprising the two trajectories set to a common scale with an image comprising only the reference trajectory, a non-conformity being detected if the number of individual points that are different between the two images is greater than a first predetermined threshold.

7. The method according to claim 4, wherein the reference map is a digital map comprising graphic objects, the step for extraction of data characteristic of the reference map implementing a vectorization method applied to the map, the aim of the processing of the raw reference trajectory being to determine the mathematical characteristics of the elements of the raw trajectory in order to derive therefrom a succession of straight segments and arcs, the comparison of the trajectory calculated by the flight management system with the reference trajectory comprising a calculation of surface area between the calculated trajectory and the reference trajectory appearing on the image comprising the two overlaid trajectories, a nonconformity being detected if the surface area exceeds a second predetermined threshold.

8. The method according to claim 1 wherein the determination of a reference trajectory from the geo-referenced reference map further comprises an image-processing substep in order to remove disturbing elements.

9. The method according to claim 1, wherein, the reference map comprising contour lines, said method further comprises a step for comparison of the calculated trajectory with data from a terrain database to detect conflicts between the trajectory and obstacles situated on the ground, the terrain database comprising data extracted from the contour lines of the reference map.

10. A device for checking the conformity of a trajectory calculated by a flight management system of an aircraft relative to reference data comprising a reference map, said reference map comprising a paper map or a digital map, comprising:

means for geo-referencing the reference map, means for determining a reference trajectory from the geo-referenced reference map, means for detecting nonconformity in the trajectory calculated by the flight management system by comparison of the trajectory calculated by the flight management system with the reference trajectory, and means for emitting a warning if a nonconformity is detected.

11. The device for checking the conformity of a trajectory according to claim 10, said device being embedded onboard the aircraft.

12. The device for checking the conformity of a trajectory according to claim 10, said device being situated on the ground in an air traffic control unit.

* * * * *